No. 685,464. Patented Oct. 29, 1901.
H. H. BOENKER.
CORN HARVESTER.
(Application filed Apr. 15, 1901.)
(No Model.) 4 Sheets—Sheet 1.
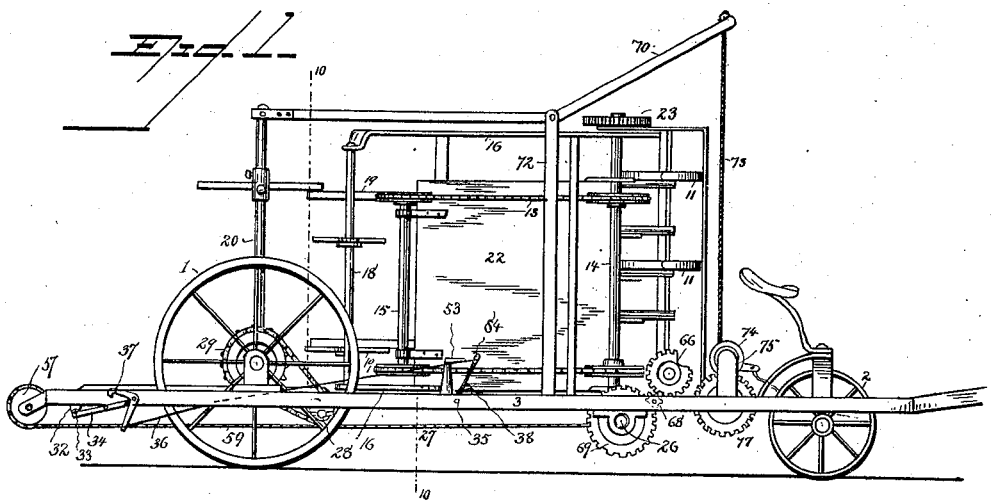
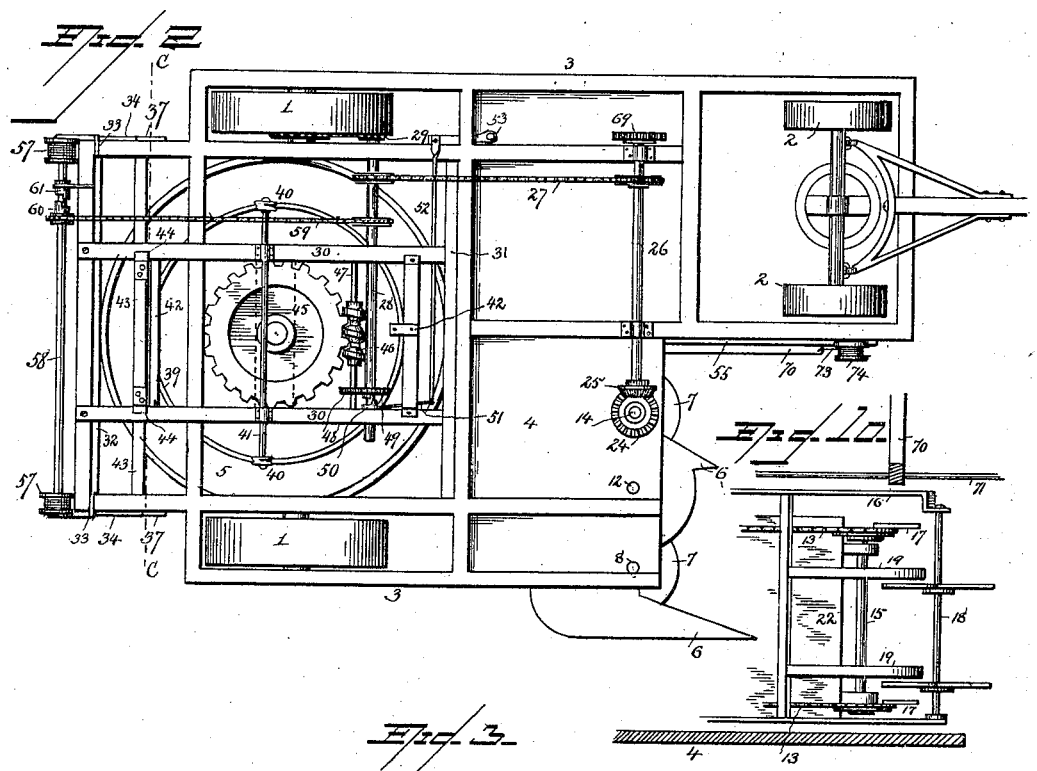
Witnesses
R. J. Beall
Frank S. Maguire
Inventor
Henry H. Boenker,
by John B. Thomas & Co.,
Attorneys.

No. 685,464. Patented Oct. 29, 1901.
H. H. BOENKER.
CORN HARVESTER.
(Application filed Apr. 15, 1901.)
(No Model.) 4 Sheets—Sheet 2.
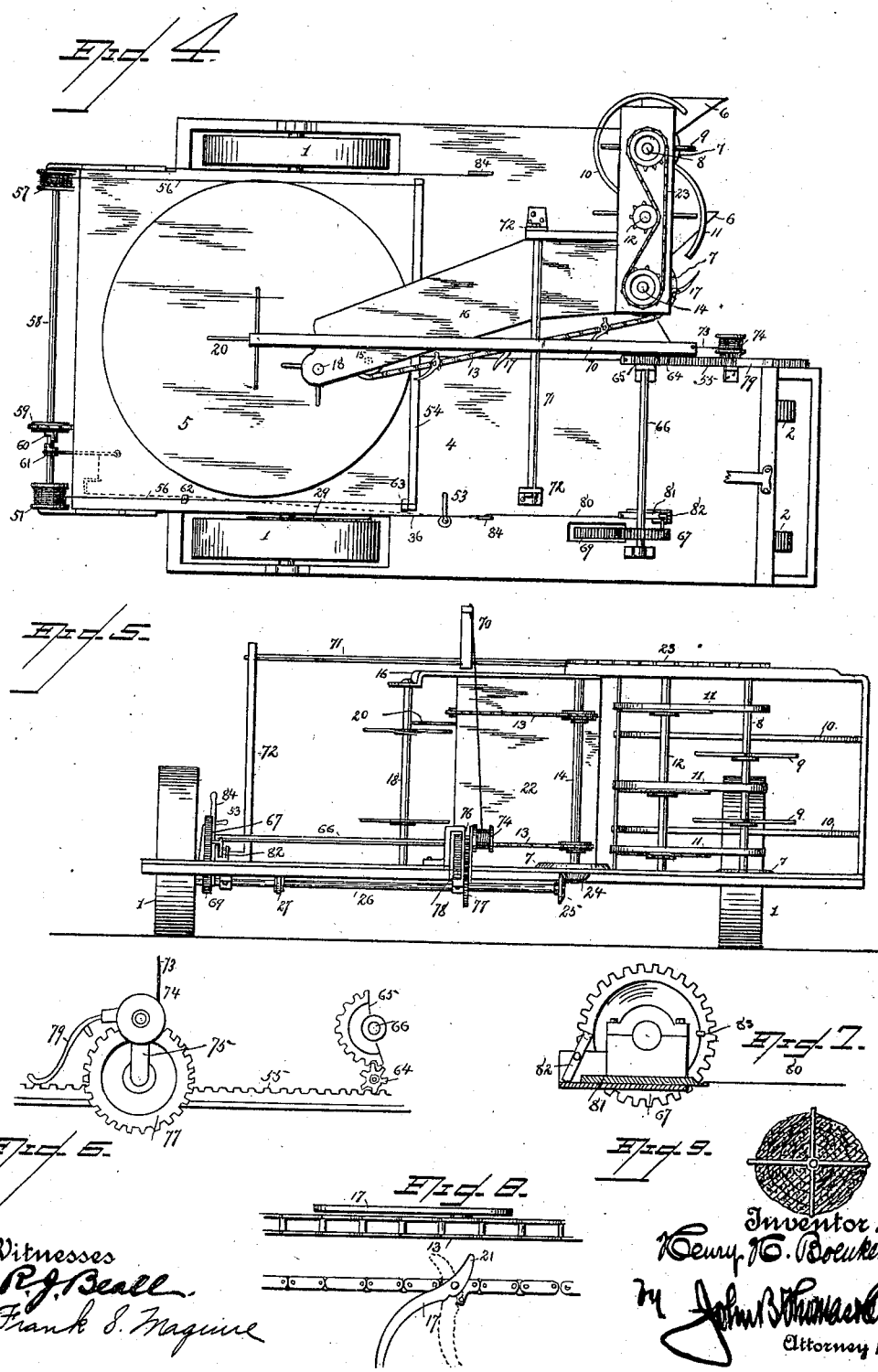

No. 685,464.  
H. H. BOENKER.  
CORN HARVESTER.  
(Application filed Apr. 15, 1901.)
Patented Oct. 29, 1901.
(No Model.)
4 Sheets—Sheet 3.
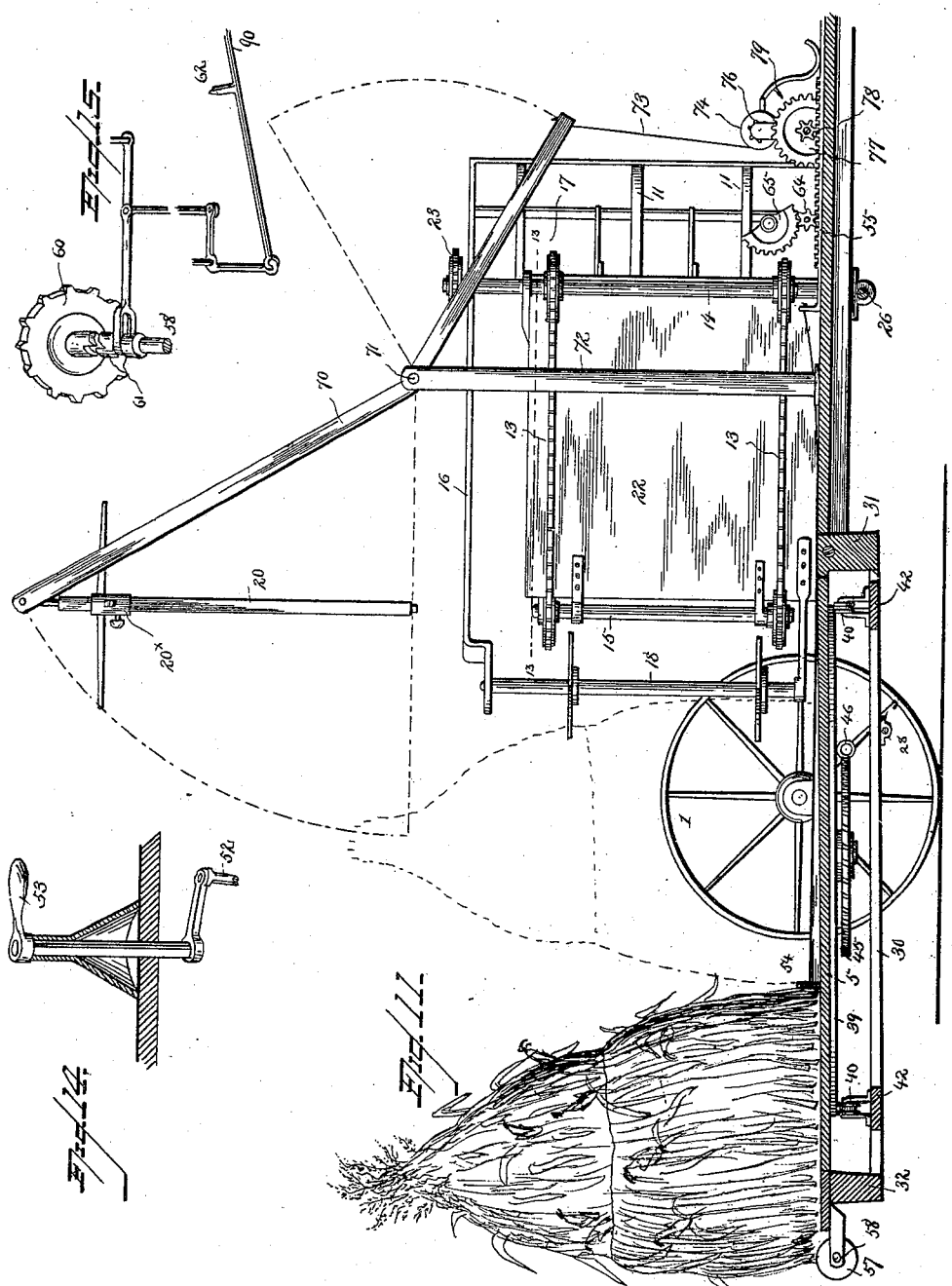
Witnesses  
Inventor:—  
Henry H. Boenker,  
by John V. Thomas & Co.,  
Attorneys.

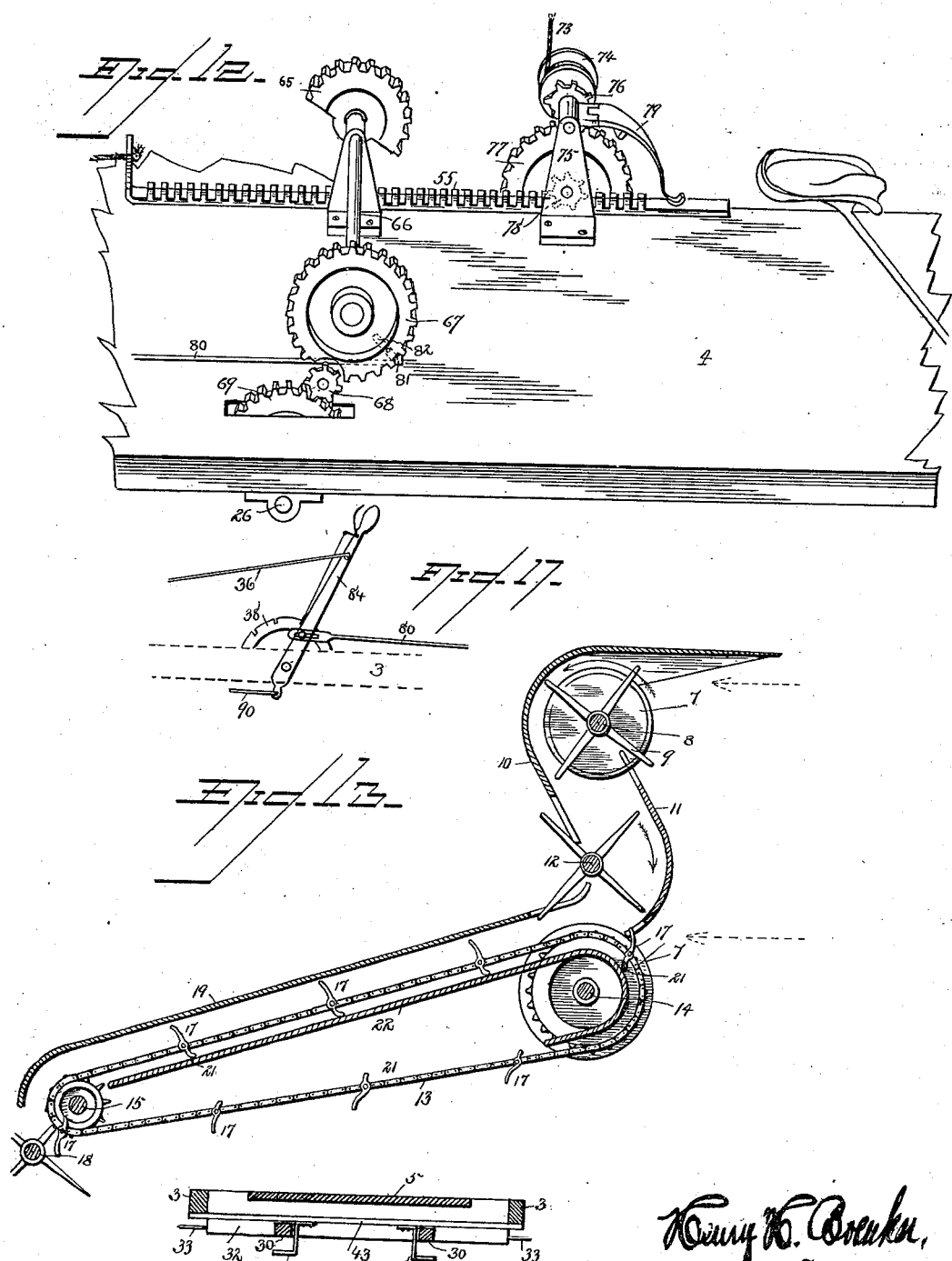

UNITED STATES PATENT OFFICE.

HENRY HERMEN BOENKER, OF ST. CHARLES, MISSOURI.

CORN-HARVESTER.

SPECIFICATION forming part of Letters Patent No. 685,464, dated October 29, 1901.

Application filed April 15, 1901. Serial No. 55,924. (No model.)

*To all whom it may concern:*

Be it known that I, HENRY HERMEN BOENKER, a citizen of the United States, and a resident of St. Charles, in the county of St. Charles and State of Missouri, have invented a Corn-Harvesting Machine, of which the following is a specification.

My invention relates to corn-harvesters which are adapted for the purpose of cutting corn and shocking it, the machine being so constructed that the team is not required to straddle the row. The machine cuts two rows at a time, and after the stalks are cut they are held in an upright position and conveyed, by means of a swinging conveyer, that adapts itself to the increasing size of the shock, to a revolving platform, the latter being provided centrally with a reel, about which the shock is built as the stalks are deposited by the conveyer. As the corn is being placed about the reel it is bound by a wire or cord, and the shock when formed will consist of a layer of stalks wound helically, as shown in Figure 9 of the drawings. When the shock is completed, the reel is elevated out of the shock and the platform is tilted to deposit the shock onto the ground in the rear of the machine and in an upright position.

The following specification enters into a detail description of the construction and operation of my improved machine, reference being had to the accompanying drawings and to numerals thereon which designate the different parts, and what I claim in the construction and combination of parts is more specifically set forth in the appended claims.

In the drawings, Fig. 1 is a side elevation of a corn-harvesting machine constructed in accordance with my invention. Fig. 2 is a bottom plan view; Fig. 3, a detail view of the mechanism that cuts the corn. Fig. 4 is a top plan view of the machine. Fig. 5 is a front view with the front wheels removed. Fig. 6 is a detail view of the driving mechanism for unloading the shock. Fig. 7 is a detail view of the means for shifting the mechanism shown in Fig. 6 in and out of gear. Fig. 8 is a detail view of a portion of the conveyer to show one of the conveyer-arms. Fig. 9 is a diagram of the shock. Fig. 10 is a cross-section on the line 10 10 of Fig. 1. Fig. 11 is a longitudinal sectional view near the right-hand side of the machine. Fig. 12 is a perspective view of the front portion of the machine. Fig. 13 is a horizontal section on the line 13 13 of Fig. 11 in plan. Fig. 14 is a vertical section of a portion of the machine to show connections between the link that starts and stops the mechanism for rotating the platform and the lever that operates said link. Fig. 15 is a detail view of the connection between the clutch mechanism that starts and stops the means for removing the shock from the platform and the link that operates the clutch. Fig. 16 is a sectional view on the line C C of Fig. 2. Fig. 17 is a detail view of one of the operating-levers and its connections.

I mount my machine upon a suitable truck consisting of the rear wheels 1 and the front wheels 2, carrying the framework 3. Upon this frame is mounted the stationary platform 4, within which is mounted the revolving platform 5, normally elevated a slight distance above the same and hereinafter more particularly described.

To one side of the front wheels of the truck or wheeled frame is located the cutting and gathering mechanism, the cutting mechanism consisting of the knives 6, which are stationary and have their cutting edges extending forwardly at an angle to make a shearing cut. The spaces in front of the cutting edges of the knives are such as to gather stalks that might not be standing straight and bring them in position to be cut, rotary cutting-disks 7 coöperating with the stationary blades in cutting the stalks, said rotary cutting-disks being carried upon vertical shafts mounted in the framework, the outer shaft 8 being provided with a reel 9, the arms of which gather the stalks and push them onto the knives. The stalks which are cut by the outer knife are conveyed by the reel 9 into a guideway formed by the guides 10 and 11, which are serpentine in form and carry the corn or stalks around the reel 9 to the reel 12, which in turn conveys them to the conveyer 13. Conveyer 13 is carried upon shafts 14 and 15, mounted in the ends of a swinging arm or frame 16, having its axis on shaft 14, the said frame being swung by an operator on the machine as the size of the shock increases. At the lower end of the shaft 14 is mounted a circular knife or cutting-disk, that coöperates with the inner stationary blade to cut the stalks in the row next the team, and instead of this shaft being provided with a reel it carries the conveyer 13, provided with the conveying-arms 17, the latter gathering the cornstalks and delivering them to the knives, and then conveys them, together with those cut by the other cutters, to the reel 18, mounted in the rear of the swinging frame 16. The stalks while they are being conveyed to the reel 18 are held in an upright position by the guards 19. (Shown in Fig. 13 of the drawings.) The stalks that are gathered between the arms of the reel 18 are taken by the reel 20, that is located in the center of the revolving platform 5 and about which the shock is built. The conveying-arms 17 are pivoted to the conveyer 13, as shown in Fig. 8, and provided with a heel 21, so that when they go back after having delivered a load of stalks they are in the position shown in Fig. 4 until they get to the front of the machine, whereupon the heel 21 engages the curved extension of the vertical plate 22, as seen in Fig. 13. The gathering-arm is thereby reversed and assumes the position shown in dotted lines in Fig. 8. The gathering-arm then is in the position to hold the corn which it receives, and it is held in such position by the continued engagement of the heel with the plate 22 until the load of corn is delivered finally to the reel 18. The shafts 8, 12, and 14 are provided with sprocket-wheels, over which extend the sprocket-chain 23. The shaft 14 of this series is driven from the bevel-gear 24, (shown in Fig. 2,) which engages the bevel-gear 25, mounted on the shaft 26. This shaft is driven by the chain 27, extending from the shaft 28, that is driven from the axle of one of the wheels 1 by the chain 29.

The workmen on the machine wait until one section of the reel 18 becomes filled with corn and then cause the platform 5 to revolve, whereby the reel 20 will take the corn from the reel 18. After the sections of the reel 20 are filled with corn the workman wraps the twine or wire around it and ties it. When another layer is deposited around this first layer, he repeats the operation and continues it until the shock becomes as large as desired. The revolving platform is mounted upon the framework, composed of the pieces 30, that extend longitudinally of the machine, and the front cross-bar 31, pivoted at its ends in the main frame. The ends of the bar 32 are provided with pins 33, adapted to be engaged by the lever 34, which is pivoted to the sides of the frame, as seen in Fig. 1. With this construction the revolving platform 5 can be tilted down slightly at its rear end. This is effected by releasing the lever 34, that is pivoted at 35 in the frame and is connected by the link 36 to the bell-crank 37, that engages one end of the lever 34, the upper rear arm of the bell-crank 37 resting upon and depressing the forward end of the lever 34. In order to elevate the rear end of the revolving platform, the lever 34 is pushed forward and locked in the rack 38.

On the under side of the revolving platform the circular track 39 rides upon the wheels 40, two of which are mounted on the ends of the stationary bar 41, that is fastened to the under side of the bars 30, and the others on the cross-bars 42, also attached to said bars 30. The cross-bar 43, that is secured to the side pieces of the main frame, Fig. 2, is provided with brackets 44, that extend downward and are adapted to support the bars 30, so as to limit the downward movement of the revolving table or platform. The revolving platform is driven by the worm-wheel 45, in mesh with the worm 46, mounted on the shaft 47. This shaft is driven by means of the spur-wheels 48 and 49, the latter being loosely mounted on the counter-shaft 28, which is driven from the main wheel 1. The spur 49 is thrown in and out of gear by the clutch mechanism 50, that is operated by the lever 51 and link 52, which in turn are actuated by the hand-lever 53, that extends up above the main platform of the machine, as seen in Fig. 14. By this construction the workman is enabled to stop or start the revolving platform 5 as he may desire. The tilting movement of the platform does not move the gear 49 enough to cause it to disengage the gear 48. In front of the revolving platform 5 there is seen in Fig. 4 the unloading-bar 54, which is secured centrally by a rope to the rear end of the rack 55, as seen in Figs. 11 and 12. At each end of this unloading-bar I secure the rope 56, wound by a drum 57, mounted on the shaft 58. This shaft is driven by the chain 59, running from the counter-shaft 28 over the loose pulley 60. This is thrown in and out of gear by the clutch mechanism 61, that is actuated, through suitable connections on the under side of the platform 4, (seen in Fig. 15,) by the trip 62, adapted to be engaged by the lug 63 on the unloading-bar 54. When the unloading-bar has been drawn rearward across the revolving table or platform to push the shock of corn off, this trip 62 is actuated, whereby the pulley 60 is thrown out of gear and the unloading-bar is moved no farther. It is returned to its normal position (shown in Fig. 4) by means of the rack 55, above referred to, which is actuated by the pinion 64 and the spur-segment 65, the latter being mounted on one end of the shaft 66. This shaft is driven by the gear-wheel 67 mounted on its other end, the said gear-wheel having its periphery notched or recessed for the purpose hereinafter described, and is driven by the intermediate gear 68, that meshes with the gear 69, which is mounted on the end of the shaft 26. Before the shock is unloaded, however, it is necessary to lift the reel 20 out of the shock. This is done by the lever 70, mounted between its ends on the shaft 71, which in turn is mounted on the uprights 72, that are secured to the frame. To the front end of the lever 70 is secured a rope 73, passing about the drum 74, mounted on a shaft with its bearing in an upright post 75. The drum 74 is driven by the pinion 76, that meshes with the spur-wheel 77, on whose shaft is secured the small pinion 78, that meshes with the rack 55. It will thus be seen that as the unloading-bar 54 moves toward the shock the rack 55 will also be moved in that direction, and this will wind the rope 73 on the drum 74, drawing down the lever 70 and lifting the reel 20 out of the shock. The rack has then moved to the right, as shown in Fig. 6, or to the left in Fig. 12, and its front end has disengaged the small pinion 78, and it is necessary to lock the spur 77. This is done by means of the gravity-pawl 79, that drops down beyond the forward end of the rack, said pawl having a lug which engages the spur 77 and holds it in place until the rack is returned. On its return the rack lifts the gravity-pawl 79 out of engagement with the wheel 77 and also engages the small pinion 78 and uncoils the rope on the drum, allowing the reel 20 to return to its place in the revolving platform for the purpose of making the next shock. When the shock is to be released, the lever 84 is moved to the rear, whereupon through the link or rod 36 it tilts the rear end of the platform slightly and at the same time draws rearward the rod 80, that is connected at one end to a pin in the lever 84, that extends through a slot in said rod, as seen in Fig. 17, and at the other end to a sliding shoe 81, Fig. 7, which engages the lower end of the pawl 82, causing the upper end of said pawl to engage the lug 83 on the side of the gear-wheel 67, and thus check the rotation of said wheel while the cog-segment 65 is out of engagement and when the pinion is in the notch or recess in the periphery of the gear-wheel 67. At the same time the lever 84 actuates the mechanism shown in Fig. 15 to throw the clutch 61 into gear, whereupon the drums 57 operate to draw the ropes 56, and thereby the unloading-bar 54, rearward. The lower end of lever 84 is connected by chain to the forward end of the rod 90 of the clutch-operating mechanism. (See Fig. 17.) The rearward movement of the unloading-bar 54, caused by the ropes 56, then draws the rack-bar 55 back. When the shock is unloaded, the workman throws the hand-lever 84 forward, thus raising the platform and releasing the engagement of the pawl 82 with the lug 83 on the cog-segment 67, whereby it will be permitted to rotate, and through the cog-segment 65 and pinion 64 the rack-bar 55 is drawn toward the front and the unloading-bar returns to its original position. The cog-segments 65 and 67 should be so mounted relatively to each other that when they stop the segment 65 will be chiefly on the front side of the shaft 66, as shown in Fig. 12, whereby its gravity will cause the segment 67 to move into engagement with pinion 68 when it is released. At the same time, as stated, the reel 20 is let down into place in the revolving platform, and the workman on the platform swings the rear end of the conveyer-frame toward the reel 20 and holds it in place while it is depositing the corn. The lower end of the reel 20 is squared and fits in a square hole or socket in the center of the revolving table.

It is intended that the sleeve $20^{\times}$, which carries the arms of the reel 20, should be adjustable upon the reel-post in order that it may be located to suit the condition of the corn. The reel is secured after adjustment by means of the set-screw.

Having thus described my invention, what I claim as new, and desire to secure by Letters Patent, is—

1. In a corn-harvester, the combination, of a suitable platform, an inner and an outer set of cutting-knives at the front end thereof, a reel-shaft mounted near the outer sets of knives, a conveyer-shaft mounted near the inner set of knives, a conveyer actuated by the conveyer-shaft and extending to the rear of the machine, a reel-shaft between the sets of knives, and means for driving the aforesaid shafts; together with reels, and guards extending by said reels and along the conveyer and coöperating with them to convey the corn in an upright position to the rear of the machine, substantially as shown and described.

2. In a corn-harvester, the combination, of a revolving platform upon which the corn is built or stacked, an unloading-bar mounted near the inner end of said platform, means for drawing the unloading-bar rearward, a rack connected to the unloading-bar, a reel removably mounted in the center of the platform, and mechanism for elevating the reel preparatory to unloading the shock, substantially as shown and described.

3. In a corn-harvester, the combination, of the cutting-knives, a revolving platform, and conveyers extending from the knives to the platform; together with a vertical reel removably mounted in the center of the platform, a lever connected to the upper end of said reel, a drum having a rope connected to the other end of said lever, a rack-bar in mesh with a pinion on the drum-shaft, rope connections extending from the rack-bar, a shaft driven from one of the ground-wheels of the machine, a drum on said shaft, and means for throwing the last-mentioned drum in and out of engagement with its shaft, substantially as shown and described.

4. In a corn-harvester, the combination, of two knife-blades arranged side by side, cutting-disks coöperating with the knives and mounted at the lower ends of driven shafts, a reel on the outer shaft, an interposed reel, and guards extending around the rear side of the outer shaft and around the forward side of the interposed shaft; together with a conveyer extending around the inner shaft and extending to the rear of the machine, substantially as shown and described.

5. In a corn-harvester, the combination, of two knife-blades, cutting-disks coöperating therewith and mounted upon vertical driven shafts, a reel on the outer shaft and an interposed reel, guards or guide-plates extending around the rear side of the outer shaft and around the forward side of the interposed reel, and a conveyer-belt extending from the inner shaft, and a guide-plate extending along one side of said conveyer-belt; together with a revolving platform at the rear end of the conveyer-belt, a removable reel mounted on said platform, and means for elevating said reel, substantially as shown and described.

HENRY HERMEN BOENKER.

In presence of—
   G. W. SEEBURGER,
   GILBERT P. BOSCHERT.